US012447493B1

(12) United States Patent
Cooper

(10) Patent No.: US 12,447,493 B1
(45) Date of Patent: Oct. 21, 2025

(54) LOCKING DEVICE FOR HOSE NOZZLE ATTACHMENTS AND ACCESSORIES

(71) Applicant: Skyler Cooper, Dallas, TX (US)

(72) Inventor: Skyler Cooper, Dallas, TX (US)

( * ) Notice: Subject to any disclaimer, the term of this patent is extended or adjusted under 35 U.S.C. 154(b) by 86 days.

(21) Appl. No.: 18/137,199

(22) Filed: Apr. 20, 2023

Related U.S. Application Data

(60) Provisional application No. 63/334,739, filed on Apr. 26, 2022.

(51) Int. Cl.
*B05B 15/65* (2018.01)
*E05B 73/00* (2006.01)

(52) U.S. Cl.
CPC .......... *B05B 15/65* (2018.02); *E05B 73/0041* (2013.01)

(58) Field of Classification Search
CPC ... E05B 73/0041; E05B 37/02; F16L 27/0804
See application file for complete search history.

(56) References Cited

U.S. PATENT DOCUMENTS

| | | | | |
|---|---|---|---|---|
| 3,913,837 | A | 10/1975 | Grant | |
| 5,303,868 | A | 4/1994 | Kroll | |
| 5,320,288 | A | 6/1994 | Ketcham, Jr. | |
| 5,833,145 | A | 11/1998 | Smith | |
| 7,501,957 | B1 * | 3/2009 | Plottke | B65D 55/14 340/572.8 |
| 7,503,194 | B2 * | 3/2009 | McNeil | E05B 73/0005 70/180 |
| 7,600,648 | B2 * | 10/2009 | Hamer | B65D 55/145 215/221 |
| 8,496,190 | B2 | 7/2013 | Chen | |
| 9,669,420 | B2 | 6/2017 | Heren et al. | |
| 10,180,018 | B1 * | 1/2019 | Simpson | A61J 7/0481 |
| 2005/0184514 | A1 * | 8/2005 | Pettesch | F16L 27/0804 285/272 |
| 2012/0018540 | A1 | 1/2012 | Gilpatrick | |
| 2017/0333919 | A1 | 11/2017 | Helmsderfer et al. | |
| 2022/0063883 | A1 * | 3/2022 | Mott | B65D 55/02 |
| 2023/0166272 | A1 * | 6/2023 | Brown | B05B 15/65 239/591 |

FOREIGN PATENT DOCUMENTS

| | | | | | |
|---|---|---|---|---|---|
| CN | 107758104 | A * | 3/2018 | B65D 51/24 |
| KR | 200475945 | | 1/2015 | |
| KR | 20160122038 | A * | 10/2016 | |
| WO | 2004000469 | A1 | 12/2003 | |
| WO | WO-2018035881 | A1 * | 3/2018 | B65D 51/24 |
| WO | 2019180728 | A2 | 9/2019 | |

* cited by examiner

*Primary Examiner* — Kristina R Fulton
*Assistant Examiner* — Noah Horowitz
(74) *Attorney, Agent, or Firm* — Van "Trey" Parham, III

(57) ABSTRACT

A hose attachment locking device for garden hose nozzle attachments and accessories. The locking device may prevent the removal of nozzle attachments and other accessories from a garden hose without first removing the locking device. Additionally, the locking device may prevent the operation of nozzle attachments and other accessories without first removing the locking device.

3 Claims, 7 Drawing Sheets

LOCKING DEVICE FOR HOSE NOZZLE ATTACHMENTS AND ACCESSORIES

CROSS-REFERENCE TO RELATED APPLICATIONS

This application claims the benefit of Unites States Provisional Patent Application Ser. No. 63/334,739, filed on Apr. 26, 2022, which is incorporated by reference herein it is entirety.

FIELD OF THE DISCLOSURE

The present invention relates generally to a locking device for hose nozzle attachments and accessories. The locking device may prevent the removal of nozzle attachments and other accessories from a hose as well as prevent the operation of nozzle attachments and other accessories without first removing the locking device.

BACKGROUND OF THE DISCLOSURE

Hoses are a necessity in daily life. From gardening, to cooking, to extinguishing fires, the hose has integrated itself into human society. Over the past century, many improvements were made to the hose from the material used, to the standardization of heads, to the introduction of nozzles. However, there is one aspect that remains relatively unchanged since the hose's conception: security.

Currently, no device exists which keeps either the hose or its accessories from being stolen. Any would-be thief could easily trespass onto a piece of property, unscrew a garden hose from the house, and abscond with the hose. Similarly, nothing exists to keep nozzles, sprinklers, and other attachments connected to the hose from being stolen either. Accordingly, there is a long felt need for a sort of security device which either prevents or at least significantly deters the theft of hoses, nozzles, and other hose accessories.

In addition, child and teenage pranksters can easily turn hoses on in the dead of night and tape nozzles on in order to flood lawns and make homeowners waste water and money. As such, there is also a long felt need to prevent the use of a hose while it is being stored.

SUMMARY OF THE DISCLOSURE

The present invention is generally directed to a locking device for hose nozzle attachments and accessories.

In a first implementation of the invention, the locking device for hose nozzle attachments and accessories can comprise a first hose locking bracket, a second hose locking bracket, and a nozzle attachment locking bracket. The first hose locking bracket and the second locking bracket are placed on the hose behind the male connecting head, and the nozzle attachment locking bracket can be placed on the nozzle attachment behind the female connecting head. The male connecting head of the hose can be then engaged with the female connecting head of the nozzle attachment. The first hose locking bracket and the nozzle attachment locking bracket are connected with a first fastener, and the second hose locking bracket and the nozzle attachment locking bracket are connected with a second fastener.

In another implementation of the invention, the first hose locking bracket and the second hose locking bracket are replaced with a singular hose locking bracket. The singular hose locking bracket would fit around the body of the hose similarly to how the nozzle attachment locking bracket fits around the body of the nozzle attachment. First, the male connecting head of the hose can be removed. The singular hose locking bracket can be then placed onto the hose and the male connecting head can be reattached to the hose. Then the singular hose locking bracket can be connected to the nozzle attachment locking bracket by a first fastener. A second fastener may also be used to further secure the singular hose locking bracket to the nozzle attachment locking bracket.

In another implementation of the invention, the singular hose locking bracket can be permanently attached to either the body of the hose or the male connecting head of the hose, and the nozzle attachment locking bracket can be permanently attached to either the nozzle attachment or the female connecting head of the nozzle attachment.

In another implementation of the invention, the nozzle attachment locking bracket extends along the nozzle attachment and prevents the nozzle attachment from being used while the nozzle attachment locking bracket can be locked to the first hose locking bracket and the second hose locking bracket.

In another implementation of the invention, the nozzle attachment can be replaced with other accessories that can connect to the male connecting head of the hose, such as faucet heads, sprinkler systems, hose splitters, and the like.

In previously described implementations of the invention, the method of operating the locking device for hose nozzle attachments and accessories involves: first, placing the nozzle attachment locking bracket over the female connecting head of the nozzle attachment; second, fully engaging the male connecting head of the hose with the female connecting head of the nozzle attachment; third, placing the first hose locking bracket and the second hose locking bracket on either side of the hose and aligned with the nozzle attachment locking bracket; fourth, securely fastening the first hose locking bracket to the nozzle attachment locking bracket with a first fastener and securely fastening the second hose locking bracket to the nozzle attachment locking bracket with a second fastener.

In an alternative implementation of the invention, the method of operating the locking device for hose nozzle attachments and accessories involves: first, removing the male connecting head from the hose, inserting the hose into the singular hose locking bracket, and reattaching the male connecting head to the hose; second, placing the nozzle attachment locking bracket over the female connecting head of the nozzle attachment; third, fully engaging the male connecting head of the hose with the female connecting head of the nozzle attachment; fourth, aligning the singular hose locking bracket with the nozzle attachment locking bracket; fifth, securely fastening the singular hose locking bracket to the nozzle attachment locking bracket with a first fastener. The singular hose locking bracket may be further securely fastened to the nozzle attachment locking bracket with a second fastener.

In all implementations of the invention, the material of the first hose locking bracket, second hose locking bracket, nozzle attachment locking bracket, and the singular hose locking bracket, may be made out of, including but limited to, metal, metal alloys and/or polymers.

In all implementations of the invention, the first fastener and the second fastener may be either screws, nails, pins, nuts and bolts, any matter of locks—including, but not limited to, traditional key-pin locks, disk detainer locks, wafer locks, combination locks electronic locks, fingerprint locks, and the like—or any other fastening device.

These and other objects, features, and advantages of the present invention will become more readily apparent from the attached drawings and the detailed description of the preferred embodiments, which follow.

BRIEF DESCRIPTION OF THE DRAWINGS

The disclosed embodiments of the invention will hereinafter be described in conjunction with the appended drawings provided to illustrate, and not to limit the invention, where like designations denote like elements, and in which.

Like reference numerals refer to like parts throughout the several views of the drawings.

DETAILED DESCRIPTION

The invention is defined by the claims. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a locking device for hose nozzle attachments and accessories.

Referring to FIGS. 1-5, a locking device for hose nozzle attachments and accessories 100 is illustrated in accordance with a first exemplary embodiment of the present invention.

Figure 1:
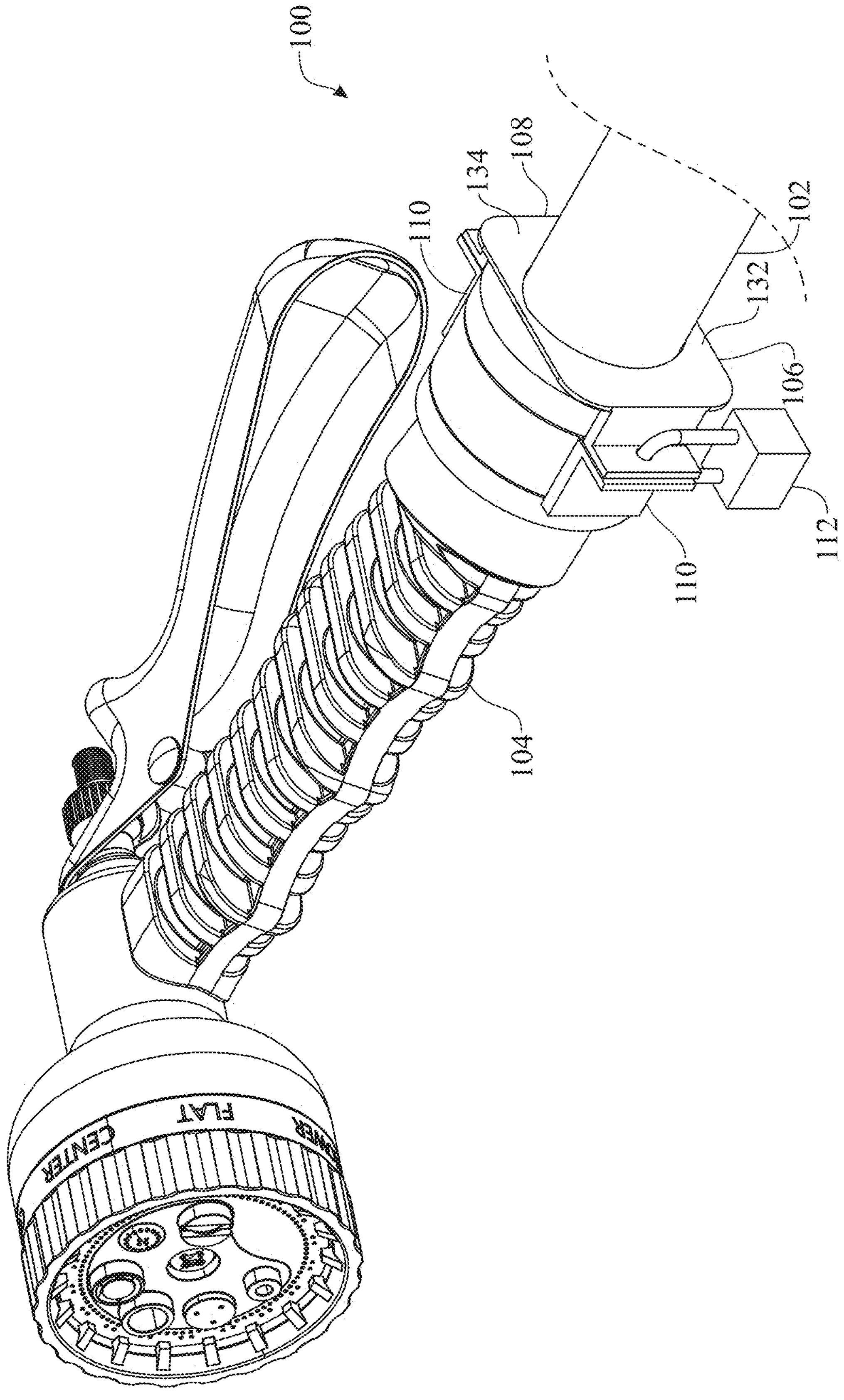
FIG. 1 is a perspective view of an exemplary embodiment of the locking device for hose nozzle attachments and accessories as described in the present disclosure, illustrating the locking device when it is fastened to a hose and nozzle attachment.
Figure 3:
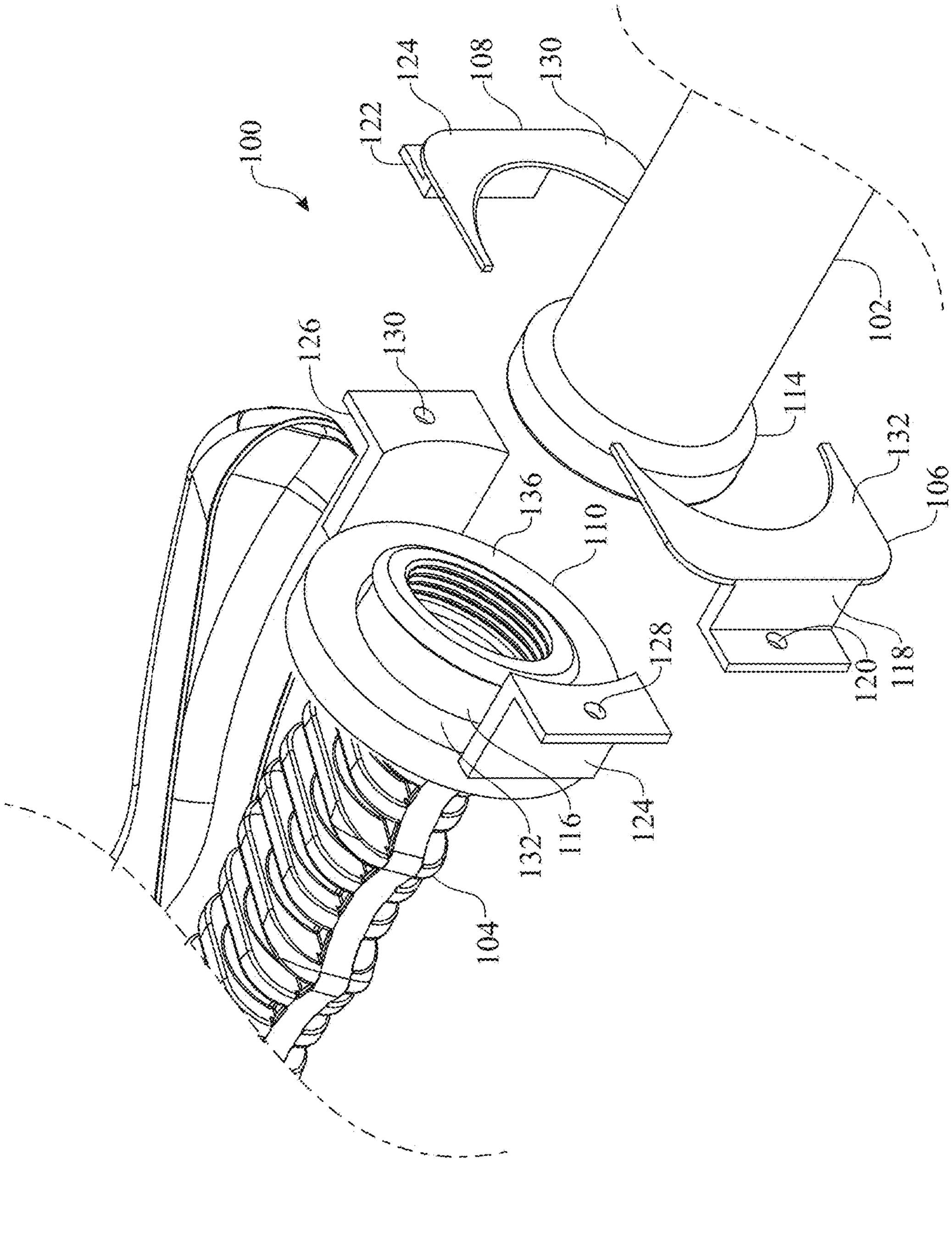
FIG. 3 is a perspective view of an exemplary embodiment of the locking device for hose nozzle attachments and accessories as described in the present disclosure.

As shown for instance in FIG. 1, the locking device for hose nozzle attachments and accessories 100 can be attached to a hose 102 and a nozzle attachment 104, and the locking device for hose nozzle attachments and accessories 100 can comprise a first hose locking bracket 106, a second hose locking bracket 108, and a nozzle attachment locking bracket 110. The first hose locking bracket 106 can comprise a top side 132 of the first hose locking bracket 106, as shown in FIG. 3; a bottom side of the first hose locking bracket, not shown; a first hose locking bracket tab 118; and a first hose locking bracket through hole 120. The second hose locking bracket 108 can comprise a top side of the second hose locking bracket 134, as shown in FIG. 3; a bottom side of the second hose locking bracket, not shown; a second hose locking bracket tab 122; and a second hose locking bracket through hole, not shown. The nozzle attachment locking bracket 110 can comprise a top side of the nozzle attachment locking bracket, not shown; a bottom side of the nozzle attachment locking bracket, as shown in FIG. 3; a first nozzle attachment locking bracket tab 124; a second nozzle attachment locking bracket tab 126; a first nozzle attachment locking bracket through hole 128; and a second nozzle attachment locking bracket through hole, 130.

Figure 4:
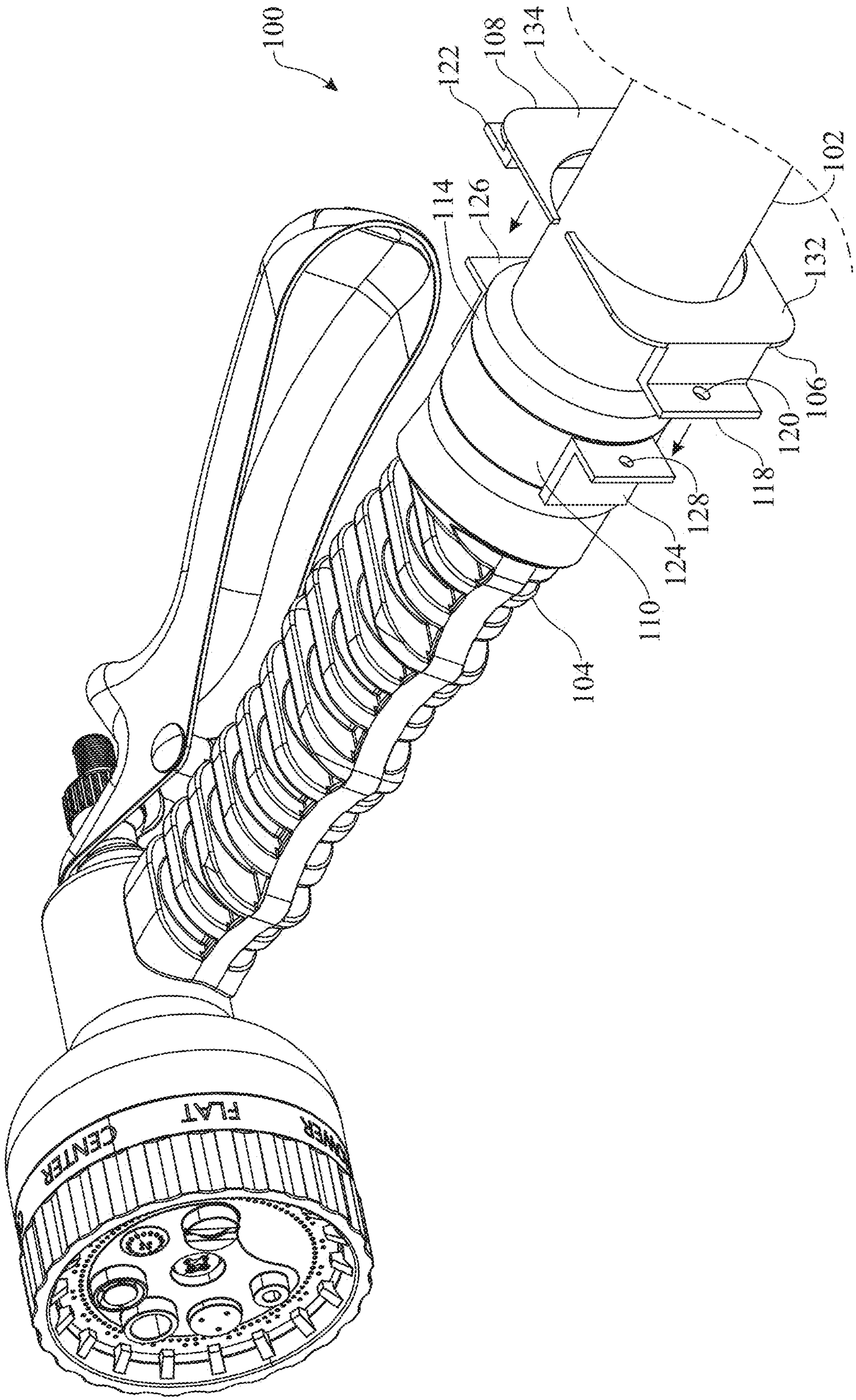
FIG. 4 is a perspective view of an exemplary embodiment of the locking device for hose nozzle attachments and accessories as described in the present disclosure.

The first hose locking bracket 106 and the nozzle attachment locking bracket 110 are connected with a first fastener 112, and the second hose locking bracket 108 and the nozzle attachment locking bracket 110 are connected with a second fastener, not shown. The first hose locking bracket 106 and the second hose locking bracket 108 are placed on the hose 102 behind the male connecting head 114, as shown in FIG. 3, wherein the bottom side of the first hose locking bracket, not shown, and the bottom side of the second hose locking bracket, not shown, make contact with the male connecting head 114. The nozzle attachment locking bracket 110 can be placed on the nozzle attachment 104 behind the female connecting head 116, as shown in FIG. 3, where the bottom side 136 of the nozzle attachment locking bracket 110 faces the male connecting head 114. The male connecting head 114 of the hose 102 can be then engaged with the female connecting head 116 of the nozzle attachment 104, as shown in FIG. 4. The first hose locking bracket tab 118 is aligned with the first nozzle attachment locking bracket tab 124 by having the first hose locking bracket through hole 120 placed immediately adjacent to the nozzle attachment locking bracket through hole 128, as shown in FIG. 3. The second hose locking bracket tab 122 is aligned with the second nozzle attachment locking bracket tab 126 by having the second hose locking bracket through hole, not shown, placed immediately adjacent to the nozzle attachment locking bracket through hole 130, as shown in FIG. 3. The first hose locking bracket 106 can be then connected to the nozzle attachment locking bracket 110 by a first fastener 112 by interjoining the first hose locking bracket through hole 120 with the first nozzle attachment locking bracket through hole 128, as shown in FIG. 1; and the second hose locking bracket 108 can be then connected to the nozzle attachment locking bracket 110 by a second fastener, not shown, by interjoining the second hose locking bracket through hole, not shown, with the second nozzle attachment locking bracket through hole 130, as shown in FIG. 1.

In this exemplary embodiment, the locking device for hose nozzle attachments and accessories 100 works as follows. After the nozzle attachment locking bracket 110 has been placed behind the female connecting head 116 of the nozzle attachment 104, and the male connecting head 114 of the hose 102 fully engages with the female connecting head 116 of the nozzle attachment 104, the nozzle attachment locking bracket 110 becomes flush with the male connecting head 114 of the hose 102, as shown in FIG. 4. At this point, when the first hose locking bracket 106 becomes fastened to the nozzle attachment locking bracket 110 with a first fastener 112, and the second hose locking bracket 108 becomes fastened to the nozzle attachment locking bracket 110 with a second fastener, not shown, both the first hose locking bracket 106 and the second hose locking bracket 108 become securely attached to the nozzle attachment locking bracket 110, as shown in FIG. 1. In this configuration, while both the first fastener 112 and second fastener, not shown, are fastened, the male connecting head 114 of the hose 102 cannot disengage from the female connecting head 116 of the nozzle attachment 104 because the pressure applied by the first hose locking bracket 106 and the second hose locking bracket 108 on the nozzle attachment locking bracket 110. Similarly, while both the first fastener 112 and second fastener, not shown, are fastened, the first hose locking bracket 106 cannot be removed: it cannot rotate either clockwise or counterclockwise around the point of connection with the nozzle attachment locking bracket 110 at the first hose locking bracket through hole 120, as shown in FIG. 1, because the body of the hose 102 prevents the first hose locking bracket 106 from rotating; and it cannot slide away from the hose 102 because it remains kept in place by the nozzle attachment locking bracket 110 which surrounds the body of the nozzle attachment 104. Likewise, while both the first fastener 112 and second fastener, not shown, are fastened, the second hose locking bracket 108 cannot be removed: it cannot rotate either clockwise or counterclockwise around the point of connection with the nozzle attachment locking bracket 110 at the second hose locking bracket through hole, not shown, because the body of the hose 102 prevents the second hose locking bracket 108 from rotating; and it cannot slide away from the hose 102 because it remains kept in place by the nozzle attachment locking bracket 110 which surrounds the body of the nozzle attachment 104. Finally, while both the first fastener 112 and second fastener, not shown, are fastened, the nozzle attachment locking bracket cannot be removed: it cannot slide down the body of the nozzle attachment 104 because it stays connected to both the first hose locking bracket 106 and the second hose locking bracket 108, as shown in FIG. 1, and because it surrounds the body of the nozzle attachment 104. Because none of the components can disengage from each other, the nozzle attachment 104 can be securely fastened to the hose 102 in this configuration while the first fastener 112 and the second fastener, not shown, remain fastened.

In an alternative exemplary embodiment, the first hose locking bracket 106 and the second hose locking bracket 108 are replaced with a singular hose locking bracket, not shown. The singular hose locking bracket can comprise a first singular hose locking bracket tab, not shown; a second singular hose locking bracket tab, not shown; a first singular hose locking bracket through hole, not shown; a second singular hose locking bracket through hole, not shown; a top side of the singular hose locking bracket, not shown; and a bottom side of the singular hose locking bracket, not shown. The singular hose locking bracket, not shown, would fit around the body of the hose 102 similarly to how the nozzle attachment locking bracket 110 fits around the body of the nozzle attachment 104, as shown in FIG. 3. First, the male connecting head 114 can be removed from the hose 102. The singular hose locking bracket, not shown, can be then placed onto the hose 102 with the bottom side of the singular hose locking bracket, not shown, facing the nozzle attachment 104, and the male connecting head 114 can be reattached to the hose 102. Then the singular hose locking bracket, not shown, can be connected to the nozzle attachment locking bracket 110 by a first fastener 112 connecting the first singular hose locking bracket through hole, not shown, with the first nozzle attachment locking bracket through hole 128. A second fastener, not shown, may also be used to further secure the singular hose locking bracket, not shown, to the nozzle attachment locking bracket 110 by connecting the second singular hose locking bracket through hole, not shown, to the second nozzle attachment locking bracket through hole 130.

In another exemplary embodiment, the singular hose locking bracket, not shown, can be permanently attached to either the body of the hose 102 or the male connecting head 114 of the hose 102, and the nozzle attachment locking bracket 110 can be permanently attached to either the nozzle attachment 104 or the female connecting head 116 of the nozzle attachment 104.

In another exemplary embodiment, the nozzle attachment locking bracket 110 extends along the nozzle attachment 104 and prevents the nozzle attachment 104 from being used by locking the nozzle attachment 104 into an off-state while the nozzle attachment locking bracket 110 can be securely fastened to the first hose locking bracket 106 and the second hose locking bracket 108 with the first fastener 112 and the second fastener, not shown.

In another exemplary embodiment, the nozzle attachment 104 can be replaced with other accessories, not shown, that can connect to the male connecting head 114 of the hose 102, such as faucet heads, sprinkler systems, hose splitters, and the like.

The material of the first hose locking bracket 106, second hose locking bracket 108, nozzle attachment locking bracket 110, and the singular hose locking bracket, not shown, may be made out of, including but limited to, metal, metal alloys and/or polymers.

The first fastener 112 and the second fastener, not shown, may be either screws, nails, pins, nuts and bolts, any matter of locks—including, but not limited to, traditional key-pin locks, disk detainer locks, wafer locks, combination locks electronic locks, fingerprint locks, and the like—or any other fastening device.

Figure 2:
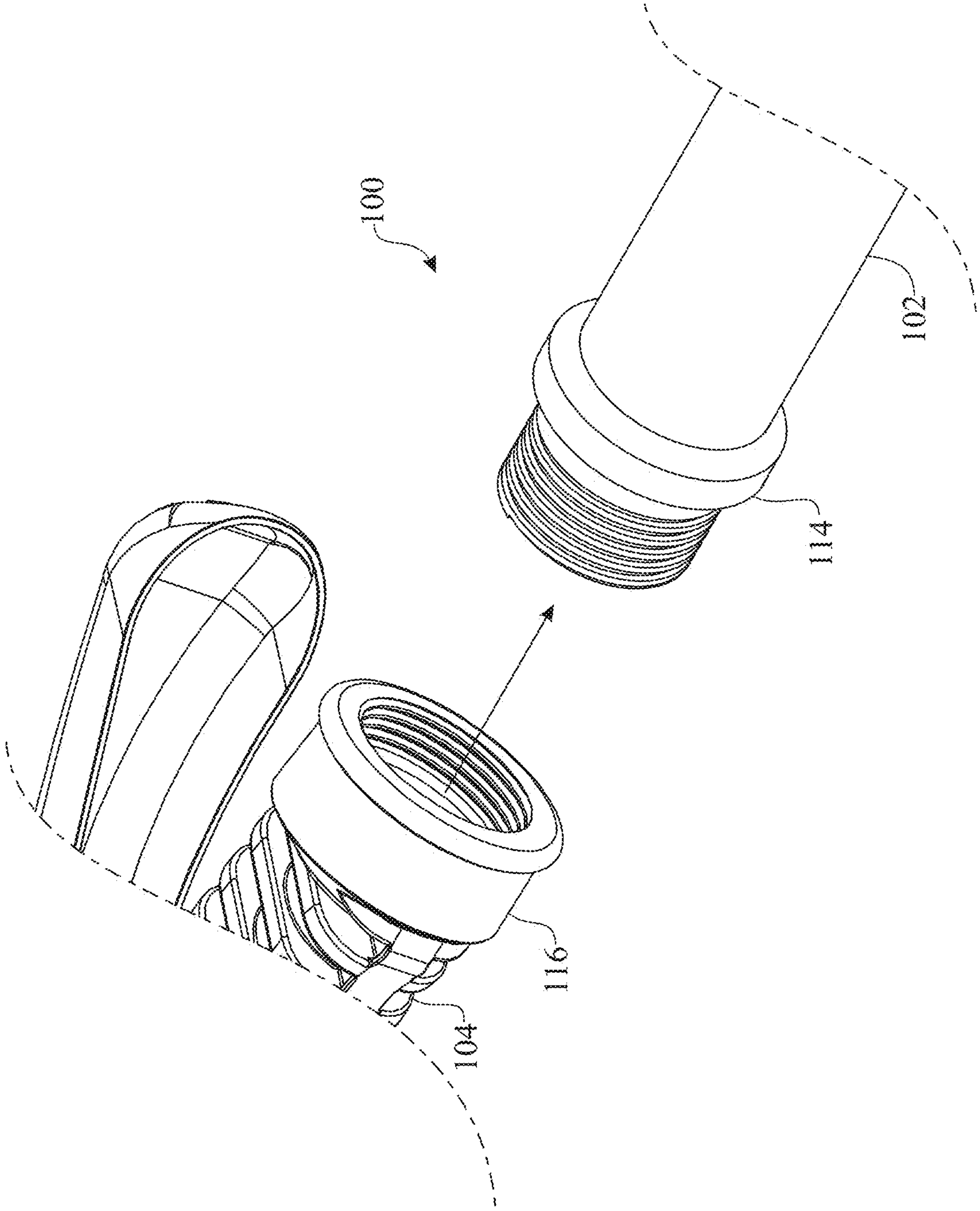
FIG. 2 is a perspective view of an exemplary embodiment of the locking device for hose nozzle attachments and accessories as described in the present disclosure.

FIG. 2, details an exemplary embodiment of the locking device for hose nozzle attachments and accessories 100 when removed from the hose 102 and the nozzle attachment 104. The hose 102 can comprise at least two ends where a first end can comprise a male connecting head 114. The nozzle attachment 104 can comprise at least two ends where the first end can comprise a female connecting head 116. The male connecting head 114 of the hose 102 can fully engage with the female connecting head 116 of the nozzle attachment 104 by either screw on threads, interlocking components, or any other such means to make them interconnected to one another.

FIG. 3 details an exemplary embodiment of the locking device for hose nozzle attachments and accessories 100 when being attached to the hose 102 and the nozzle attachment 104 prior to when the male connecting head 114 fully engages with the female connecting head 116. The first hose locking bracket 106 and the second hose locking bracket 108 are placed on the hose 102 behind the male connecting head 114, as shown in FIG. 3, wherein the bottom side of the first hose locking bracket, not shown, and the bottom side of the second hose locking bracket, not shown, make contact with the male connecting head 114. The nozzle attachment locking bracket 110 can be placed on the nozzle attachment 104 behind the female connecting head 116, as shown in FIG. 3, where the bottom side 136 of the nozzle attachment locking bracket 110 faces the male connecting head 114.

FIG. 4 details an exemplary embodiment of the locking device for hose nozzle attachments and accessories 100 when being attached to the hose 102 and the nozzle attachment 104 prior to (FIG. 3) when the male connecting head 114 fully engages with the female connecting head 116. After the nozzle attachment locking bracket 110 has been placed behind the female connecting head 116 of the nozzle attachment 104, and the male connecting head 114 of the hose 102 fully engages with the female connecting head 116 of the nozzle attachment 104, the nozzle attachment locking bracket 110 becomes flush with the male connecting head 114 of the hose 102, as shown in FIG. 4. The first hose locking bracket 106 can be fastened to the nozzle attachment locking bracket 110 with a first fastener 112 (see FIGS. 1 and 5), and the second hose locking bracket 108 can be fastened to the nozzle attachment locking bracket 110 with a second fastener, not shown, both the first hose locking bracket 106 and the second hose locking bracket 108 become securely attached to the nozzle attachment locking bracket 110, as shown in FIG. 1.

Figure 5:
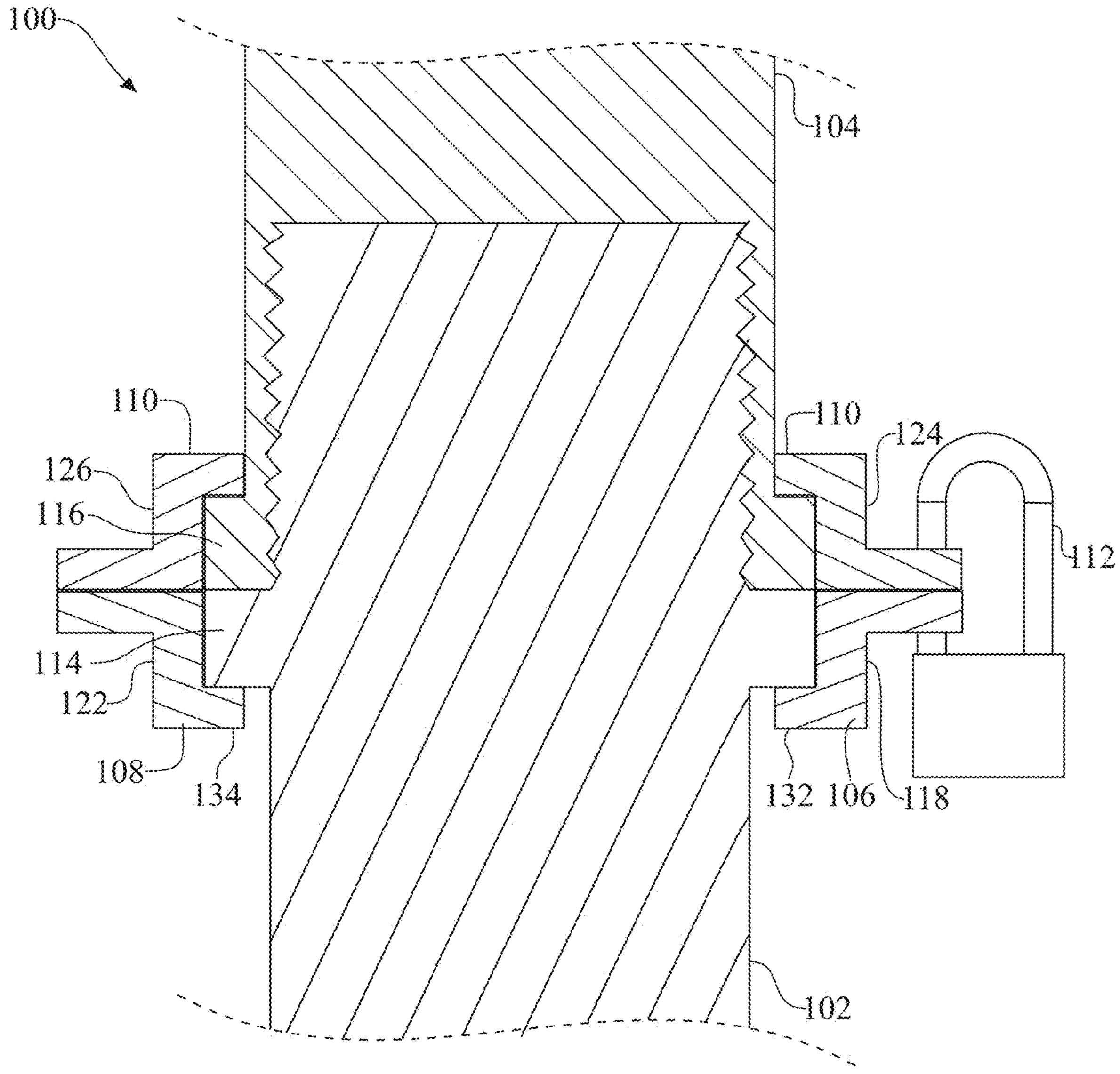
FIG. 5 is a cross-sectional perspective view of an exemplary embodiment of the locking device for hose nozzle attachments and accessories as described in the present disclosure.

FIG. 5 details a cross-sectional depiction of an exemplary embodiment of the locking device for hose nozzle attachments and accessories 100 as previously described. The first hose locking bracket 106 can comprise a top side of the first hose locking bracket 132, as shown in FIG. 3; a bottom side of the first hose locking bracket, not shown; a first hose locking bracket tab 118; and a first hose locking bracket through hole 120. The second hose locking bracket 108 can comprise a top side 134 of the second hose locking bracket 108, as shown in FIG. 3; a bottom side of the second hose locking bracket, not shown; a second hose locking bracket tab 122; and a second hose locking bracket through hole, not shown. The nozzle attachment locking bracket 110 can comprise a top side of the nozzle attachment locking bracket, not shown; a bottom side of the nozzle attachment locking bracket, as shown in FIG. 3; a first nozzle attachment locking bracket tab 124; a second nozzle attachment locking bracket tab 126; a first nozzle attachment locking bracket through hole 128; and a second nozzle attachment locking bracket through hole, 130.

The first hose locking bracket 106 and the nozzle attachment locking bracket 110 are connected with a first fastener 112, and the second hose locking bracket 108 and the nozzle attachment locking bracket 110 are connected with a second fastener, not shown. The first hose locking bracket 106 and the second hose locking bracket 108 are placed on the hose 102 behind the male connecting head 114, as shown in FIG. 3, wherein the bottom side of the first hose locking bracket, not shown, and the bottom side of the second hose locking bracket, not shown, make contact with the male connecting head 114. The nozzle attachment locking bracket 110 can be placed on the nozzle attachment 104 behind the female connecting head 116, as shown in FIG. 3, where the bottom side of the nozzle attachment locking bracket 136 faces the male connecting head 114. The male connecting head 114 of the hose 102 can be then engaged with the female connecting head 116 of the nozzle attachment 104, as shown in FIG. 4. The first hose locking bracket tab 118 is aligned with the first nozzle attachment locking bracket tab 124 by having the first hose locking bracket through hole 120 placed immediately adjacent to the nozzle attachment locking bracket through hole 128, as shown in FIG. 3. The second hose locking bracket tab 122 is aligned with the second nozzle attachment locking bracket tab 126 by having the second hose locking bracket through hole, not shown, placed immediately adjacent to the nozzle attachment locking bracket through hole 130, as shown in FIG. 3. The first hose locking bracket 106 can be then connected to the nozzle attachment locking bracket 110 by a first fastener 112 by interjoining the first hose locking bracket through hole 120 with the first nozzle attachment locking bracket through hole 128, as shown in FIG. 1; and the second hose locking bracket 108 can be then connected to the nozzle attachment locking bracket 110 by a second fastener, not shown, by interjoining the second hose locking bracket through hole, not shown, with the second nozzle attachment locking bracket through hole 130, as shown in FIG. 1.

Figure 6:
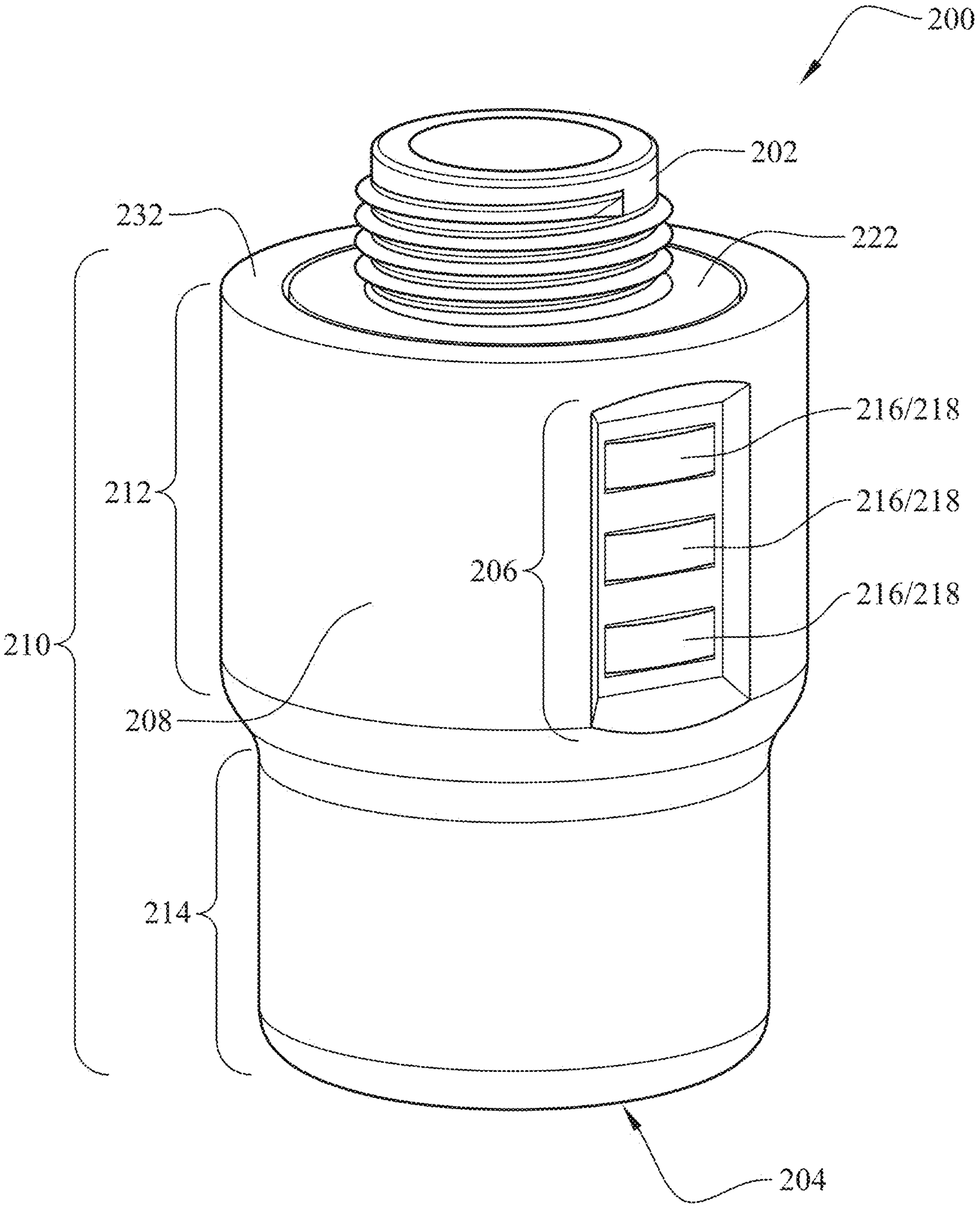
FIG. 6 is a perspective view of an exemplary embodiment of the locking device for hose nozzle attachments and accessories as described in the present disclosure.
Figure 7:
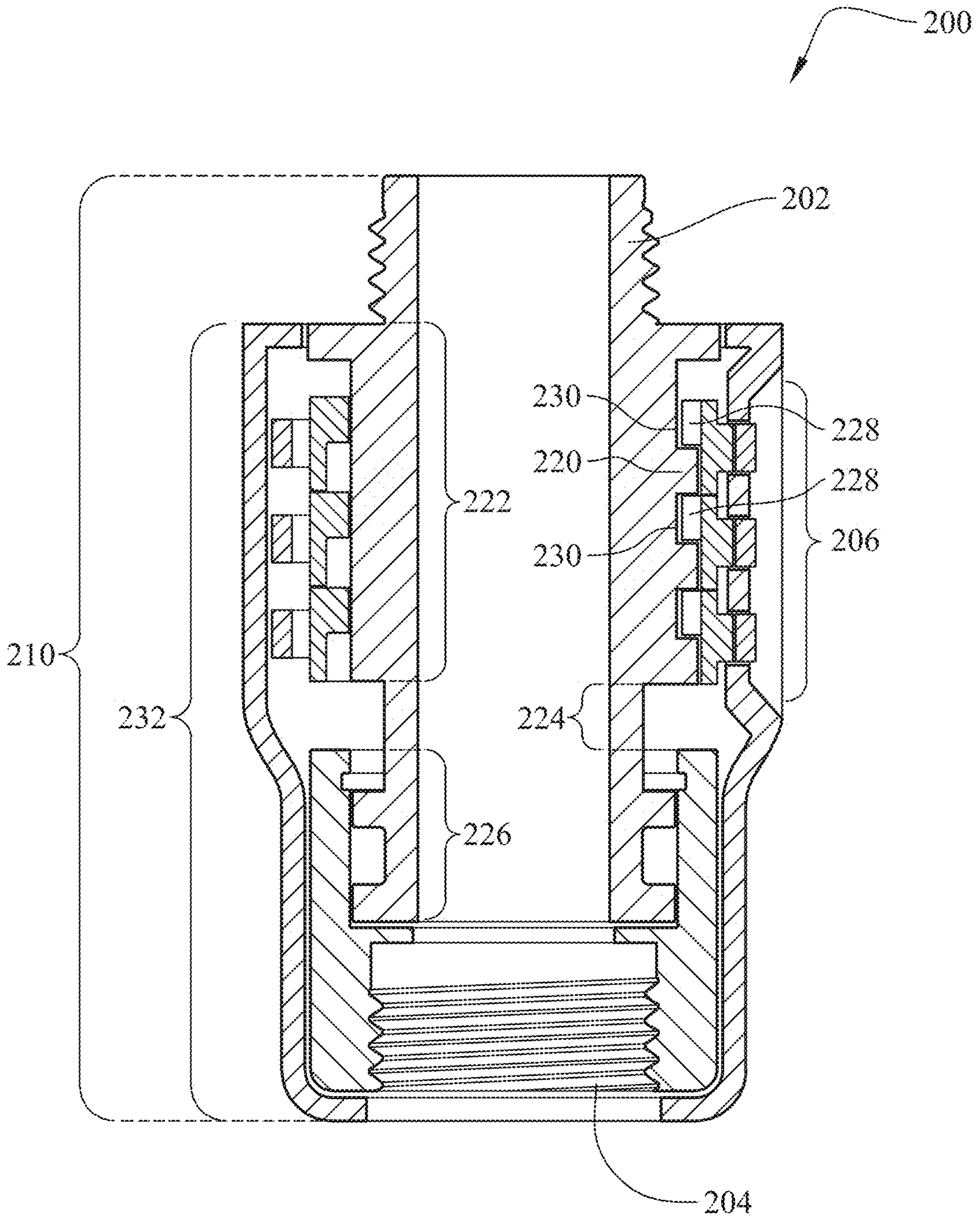
FIG. 7 is a cross-sectional view of an exemplary embodiment of the locking device for hose nozzle attachments and accessories as described in the present disclosure.

Referring now to FIGS. 6-7 there is provided a hose ends locking combination lock 200 which has a male connecting end 202 and an opposing female connecting end 204 and a combination lock mechanism 206 on an exterior surface 208 of a cylindrical body 210. The cylindrical body 210 having a long er diameter upper body portion 212 having a diameter of from about 0.75 inches up to about 1.5 inches, and a smaller diameter lower body portion 214 which has a diameter of from about 0.5 inches up to about 1.0 inch. The combination lock mechanism 206 can have a series of combination disk number dials 216 which rotate in a rotary manner inside the cylindrical body 210 and have a series of numbers (not shown), e.g., 0-9, or 1-9, on a face 218 of combination disk number dials 216.

Still referring to FIGS. 6 and 7 the actuation of the hose ends locking combination lock 100 is as follows. The combination lock dials 218 can be set to the preset combination. Such a configuration permits the internal lock mechanism 220 to fix the three internal cylinders 222, 224 and 226 inside the in an unlocked position which provides connection points between internal protrusions 228 and internal apertures 230 and provides a locked position of the internal cylinders 222, 224 and 226 with the external ratchet 232. The locking of the three internal cylinders 222, 224 and 226 provides resistance so that the male end 202 can be secured into a female end of a hose attachment (not shown) such as a spray head (not shown) and the female end 204 can be secured into a male end of a hose (not shown). Then the combination lock dials 216 can be changed to a set of numbers other than the pre-set combination, which then removes the connection points between the protrusions 228 and the internal apertures 230 such that there is no connection between the external ratchet 232 and the internal cylinders 222, 224 and 226. Therefore, since there is no resistance to the turning of the spray head end (not shown) or the hose end (not shown) and the external ratchet 232 just spins, the spray head (not shown) and the hose (not shown) cannot be removed from the combination lock 100.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A hose ends locking combination lock comprising:

a cylindrical body;

a male connecting end on one end of the cylindrical body;

an opposing female connecting end on the opposing end of the cylindrical body;

a combination lock mechanism located on an exterior surface of the cylindrical body and which has a series of combination disk number dials capable of rotating in a rotary manner along an inside of the cylindrical body and engaging therein with at least one internal cylinder inside the cylindrical body, and having a series of numbers on an external face of at least three combination disk number dials;

and wherein the combination lock mechanism has a preset combination which, when set, causes the combination lock mechanism to fix the at least one internal cylinder inside the cylindrical body in relation to an exterior surface of the cylindrical body, wherein the external surface has an external ratchet mechanism.

2. The hose ends locking combination lock of claim 1, wherein the locking of the at least one internal cylinder provides resistance such that the male end is capable of being secured into a female end of a hose attachment and the female end is capable of being secured into a male end of a hose, and wherein a set of numbers other than the pre-set combination, is set in the combination lock such removes engagement between the at least one internal cylinder and external ratchet mechanism, which prevents the removal of the hose attachment and the hose from the hose ends locking combination lock.

3. The hose ends locking combination lock of claim 1, wherein combination disk number dials are capable of engaging therein with the at least one internal cylinder inside the cylindrical body by connection points between protrusions extending from an inside surface of the dials and apertures along the at least one internal cylinder.

* * * * *